F. E. WINCHESTER.
DIRIGIBLE HEADLIGHT.
APPLICATION FILED JULY 22, 1918.
1,318,333.
Patented Oct. 7, 1919.
2 SHEETS—SHEET 1.
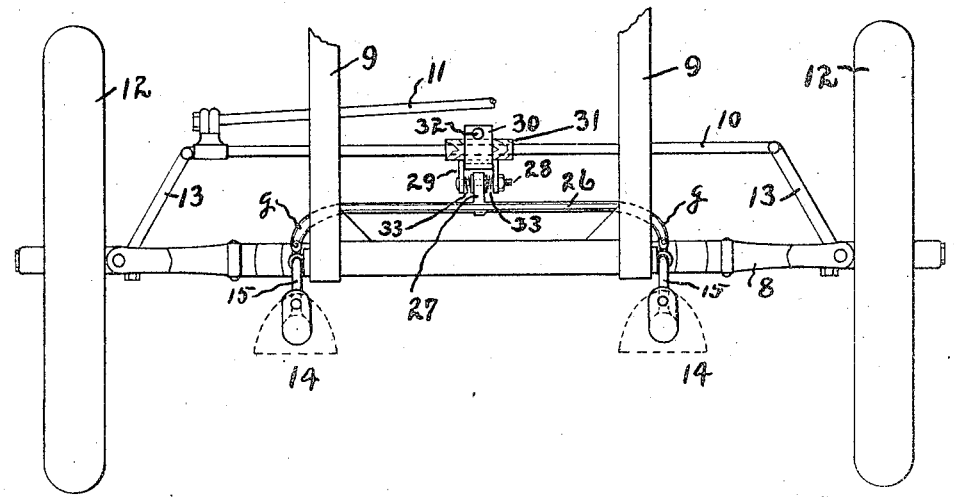
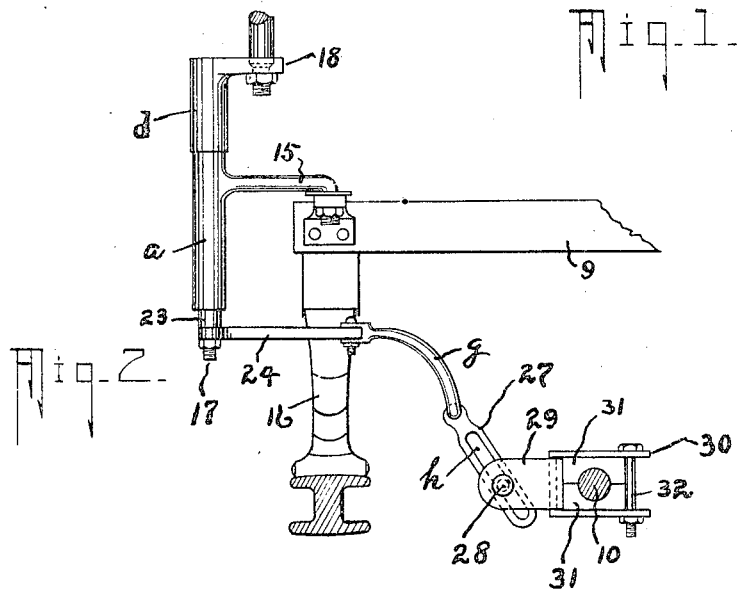
Inventor
FRED E. WINCHESTER.
By Arthur H. Sturges.
Attorney

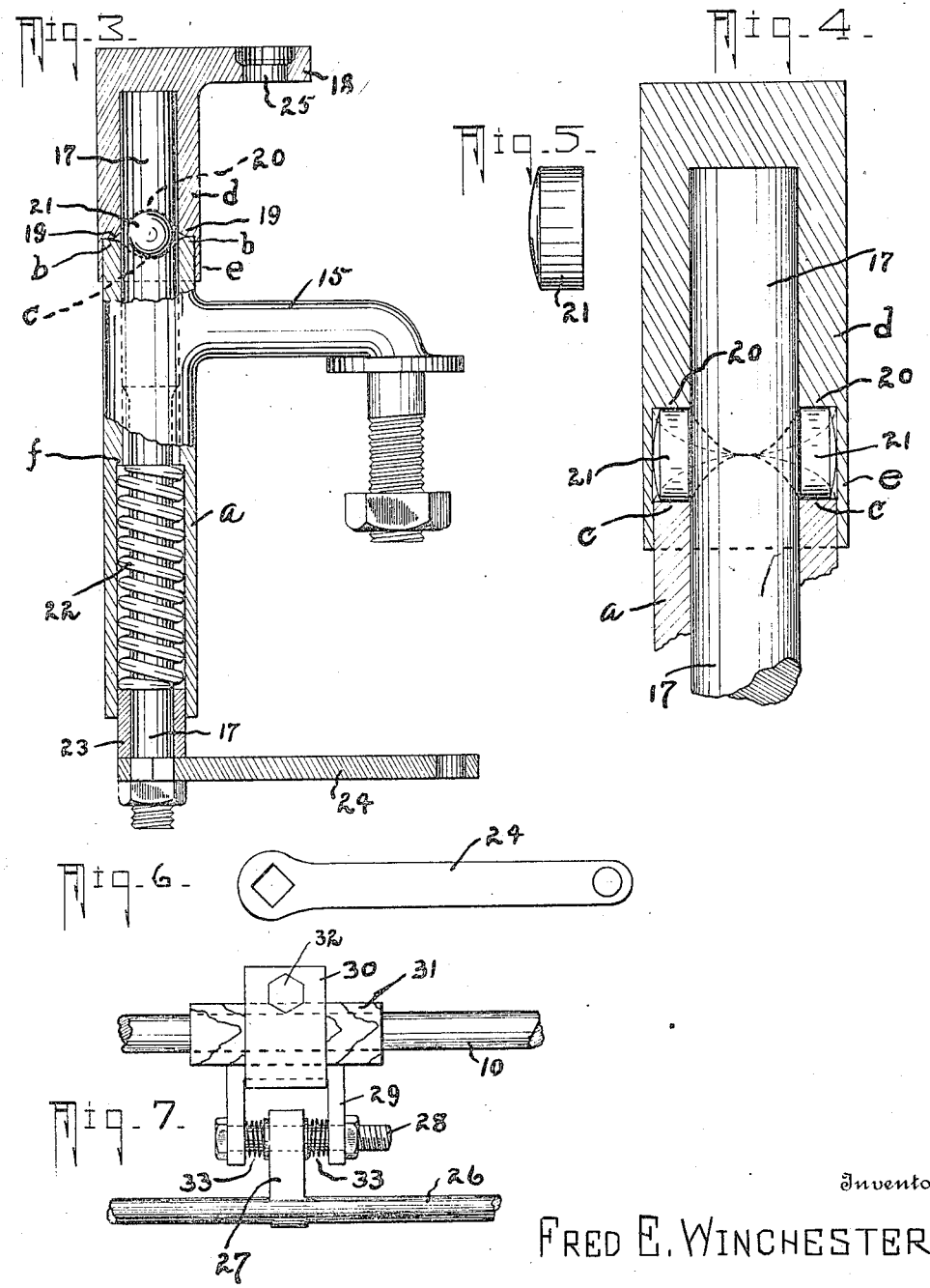

UNITED STATES PATENT OFFICE.

FRED E. WINCHESTER, OF LINCOLN, NEBRASKA, ASSIGNOR OF ONE-THIRD TO A. L. SUMPTION AND ONE-THIRD TO FRED S. CRAMER, BOTH OF WICHITA, KANSAS.

DIRIGIBLE HEADLIGHT.

1,318,333.　　　　Specification of Letters Patent.　　Patented Oct. 7, 1919.

Application filed July 22, 1918. Serial No. 246,007.

*To all whom it may concern:*

Be it known that I, FRED E. WINCHESTER, a citizen of the United States, residing at Lincoln, in the county of Lancaster and State of Nebraska, have invented certain new and useful Improvements in Dirigible Headlights, of which the following is a specification.

This invention relates to a vehicle attachment useful at night to cause swinging movements of the lamps or head lights coincidently with the rotation of the steering wheel, so that the light will be reflected in a direction of the intended course of travel of a vehicle when moving upon curves, and useful at all times for a control of the connecting-rod, so that the movement of the vehicle will normally be maintained in a direct line, this last feature being particularly of advantage when driving over rough surfaces, to facilitate steering.

The invention consists of the novel construction, combination and arrangement of parts as described herein and claimed, and as illustrated in the accompanying drawings, wherein,—

Figure 1 is a plan view showing the front part of an automobile. Fig. 2 is an enlarged detail showing a bracket and lamp holder. Fig. 3 is a detail partly in longitudinal section showing the lamp holder. Fig. 4 is a sectional detail taken at right angles to the view shown in Fig. 3. Fig. 5 is a side view of a roller shown in Figs. 3 and 4. Fig. 6 is a plan view of a crank-arm. Fig. 7 is a plan view showing a part of a connecting-rod and an operating-rod, and their connection, being a detail relating to Fig. 1.

The invention is illustrated in connection with the conventional front axle 8, vehicle frame 9 and connecting-rod 10 of an automobile; and it is well known that for purposes of steering a motor vehicle, the connecting-rod 10 is moved longitudinally by operation of a steering-wheel (not shown), the reach-rod 11, which is attached to the rod 10 being movable by said steering-wheel, the movement of the connecting-rod 10 causing the wheels 12 to swing transversely by operation of the levers (or bell cranks) 13 which are pivotally connected with said rod.

In order that the pair of reflectors or lamps 14 may be swung transversely of the vehicle in either direction by operation of the steering-wheel and connecting-rod 10, and that the swinging movements of the lamps will be coincident with the movements of said rod, I provide certain devices consisting, in part, of a pair of tubular brackets 15, these preferably being mounted in such a manner upon the vehicle frame, above the vehicle springs 16, that they will project outwardly of the sides of the frame, forwardly of the front axle.

As best shown in Figs. 3 and 4, the upper end of each vertical, tubular part *a* of a bracket 15 is formed with a pair of convexed projections *b* disposed 180 degrees apart, and is formed, intermediate said projections with a pair of concaved depressions *c*.

Disposed within each tubular part *a* to project both above and below the ends thereof is a spindle 17, and upon the upper end of each spindle is rigidly mounted, preferably by welding, the tubular part *d* of a lamp-bracket 18, the lower end of said part *d* being provided with a flange *e*, and when the parts are assembled, the flanges *e* engage the sides of the tubular parts *a* of the pair of brackets 15.

The lower end of the tubular part *d* of each lamp bracket 18 is provided, adjacent to a flange *e* with a pair of opposed convexed projections 19 and a pair of opposed concaved depressions 20, the degree of curvature corresponding to the curvature of the parts *b* and *c* of the spindle, and numerals 21 indicate a pair of rollers interposed opposite to each other between the ends of the tubular parts *a* and *d* of the brackets mentioned, said rollers being disposed in the depressions *c* of the brackets 15. Each bracket 15 is provided with a spring 22, its upper end abutting upon a ledge or equivalent holder provided for said bracket, its lower end preferably being in engagement with a collar, sleeve or washer 23. Upon the lower end of each spindle is rigidly mounted an arm 24, and in operation, the brackets 18 may have swinging movements if the arms 24 are swung, said movements of the brackets 18, however, being resisted by the springs 22 for the reason that the convexed ridges 19 of the brackets 18 will be pressed upon the peripheries of the rollers 21 during the rotatable movement of the tubular parts $d$, and during said rotatable movements the brackets 18 will move upwardly a limited distance against the force of the springs, the flanges $e$ sliding on the sides of the tubular parts $a$.

Each bracket 18 is provided with an aperture 25 (Fig. 3), these apertures being used for attaching the head-lights or lamps thereto; and as described, the lamps will be normally maintained in a stationary or normal position since the rollers 21 will normally be disposed in the concaved parts $c$ and 20 above mentioned, and on account of the construction as described, after the lamps have been swung in a circle's arc by operation of arms 24, the springs 22 will tend to cause the lamps to return to their normal position, the movement of the arms 24, in one direction, being against the force of said springs 22.

I provide an operating-rod 26, preferably having transverse end-portions $g$ which are pivotally connected with the arms 24 as best shown in Fig. 2, said rod 26 being disposed substantially parallel with the connecting-rod 10 below the vehicle frame and provided, midway between the ends, with a projection or tongue 27 having a slot $h$ formed therein for receiving a bolt 28 of a clevis 29. Numeral 30 indicates a second clevis in engagement with the clevis 29 and suitably connected with the connecting-rod 10, this connection being by means of the pair of clamping-blocks 31 which are carried by the clevis 30 and are pressed against the rod 10 by means of the bolt 32.

As thus described, a longitudinal movement of the rod 10, will cause a corresponding movement of the rod 26 for causing swinging movements of the arms 24 to move or swing the lamps, and it will be understood that if the driver of a vehicle, by use of a steering wheel or other control, causes a vehicle to move on a curve to the "right" or "left" the lamps or reflectors 14 will have corresponding movements for the purpose mentioned.

Numerals 33 indicate a pair of springs which are mounted upon the bolt 28 at the respective sides of the tongue 27, inwardly of the arms of the clevis 29, the resiliency of these springs being of lesser degree than the resiliency of the springs 22, and in operation the springs tend to maintain the rod 10 in a stationary position, and resist a movement thereof which is a feature of great advantage at all times when the vehicle is in use, especially when driving over rough surfaces, since the steering mechanism will be normally held in such a position that the vehicle will move in a direct line.

In operation, a longitudinal movement of the rod 10 either to the "right" or "left" will be against the force of one of the springs 33, and after the rod 10 has been moved longitudinally a limited distance, the tongue 27 sliding on the bolt 28, both of the springs 22 will be compressed, with the result that the reflectors 14 will be swung, and the vehicle will be moved upon a curve, the reflectors swinging in the same direction as the movement of the vehicle.

The device as described may be conveniently manufactured and may be readily applied to motor vehicles at the factory or afterward, without changing structural parts. While I have explained details of construction I do not wish to be understood as limiting myself in this respect, and I may change minor details as well as size, form and proportion without departing from the invention, since the scope of the invention is determined by the claims.

What I claim as my invention is,—

1. In a dirigible headlight, the combination with the longitudinally movable connecting rod for moving the vehicle wheels transversely of the axle, an operating bar movable with the connecting bar, a bracket rigidly mounted on the vehicle frame and having an upright tubular part with curved depressions in its upper end, rollers in said depressions, a spindle revoluble in said tubular part of the bracket, a lamp bracket having a tubular part rigidly mounted upon the upper end of the spindle and having curved depressions in the lower end of its tubular part to receive said rollers and having convexed ridges between the depressions, an arm carried on the lower end of the spindle and connected to said operating bar, and resilient means for maintaining said tubular parts in contact with said rollers and resisting revoluble movement of the spindle.

2. In a dirigible headlight, the combination with the longitudinally movable connecting rod for moving the vehicle wheels transversely of the axle, an operating bar movable with the connecting bar, a bracket rigidly mounted on the vehicle frame and having an upright tubular part open at opposite ends and with curved depressions in its upper end, rollers in said depressions, a spindle revoluble in said tubular part of the bracket and projecting therebelow, a lamp bracket having a tubular part rigidly mounted on the upper end of the spindle and having an enlarged opening in its lower end to receive the tubular part of the vehicle bracket and having curved depressions in the open end to receive said rollers and having convexed ridges between the depressions, an arm connecting the lower end of the spindle to the operating bar, and a spring inclosed in the tubular part of the vehicle bracket and engaging the spindle to urge the same downwardly and resist revoluble movement of the spindle.

In testimony whereof, I have affixed my signature in presence of two witnesses.

FRED E. WINCHESTER.

Witnesses:
MARTHA M. GUNTHER,
VANGIE MURPHY.